United States Patent
Bauchot et al.

(10) Patent No.: US 6,725,422 B1
(45) Date of Patent: Apr. 20, 2004

(54) METHOD AND SYSTEM IN AN ELECTRONIC SPREADSHEET FOR INTRODUCING NEW ELEMENTS IN A CELL NAMED RANGE ACCORDING TO DIFFERENT MODES

(75) Inventors: Frederic Bauchot, Saint Jeannet (FR); Albert Harari, Nice (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/532,502

(22) Filed: Mar. 21, 2000

(30) Foreign Application Priority Data

Aug. 20, 1999 (EP) .............................. 99480078

(51) Int. Cl.⁷ ................................ G06F 17/00
(52) U.S. Cl. ...................... 715/503; 715/504
(58) Field of Search ................ 715/503–504, 715/506–509

(56) References Cited

U.S. PATENT DOCUMENTS

| | | | | | |
|---|---|---|---|---|---|
| 5,255,356 A | * | 10/1993 | Michelman et al. | ........ | 715/504 |
| 5,371,675 A | * | 12/1994 | Greif et al. | ................ | 715/503 |
| 5,379,372 A | * | 1/1995 | Wu | ............................. | 715/506 |
| 5,416,895 A | * | 5/1995 | Anderson et al. | ........... | 715/503 |
| 5,717,939 A | * | 2/1998 | Bricklin et al. | ............. | 715/503 |
| 5,845,300 A | * | 12/1998 | Comer et al. | ............... | 715/508 |
| 6,411,959 B1 | * | 6/2002 | Kelsey | ........................ | 707/101 |
| 6,415,305 B1 | * | 7/2002 | Agrawal et al. | ............ | 715/503 |

OTHER PUBLICATIONS

Lotus 1–2–3 User's Guide for Windows Release 1.0, 1991, Lotus Development Corporation, p. 55, pp. 64–69, p. 155.*

* cited by examiner

*Primary Examiner*—Joseph H. Feild
*Assistant Examiner*—James H Blackwell
(74) *Attorney, Agent, or Firm*—A. Bruce Clay; Carstens, Yee & Cahoon, LLP

(57) ABSTRACT

A named range defined by a cell address range in a spreadsheet comprises a plurality of cells identified in each dimension by an address, each dimension comprising two directions. An open named range is specifyed to the named range in at least one open direction. A hidden named range with the cell address range of the open named range is expanded by one address in every direction specified as open. In response to user action, at least one direction is selected, the cell address range of the hidden named range is increased by inserting between two consecutive cell addresses, a new address in selected directions, the open named range is updated with the cell address range of the hidden named range shortened by one address in every direction specified as open.

7 Claims, 7 Drawing Sheets

| User Range Name | User Range Address | Range Openess Direction | | | | | | Hidden Range Name | Hidden Range Address |
|---|---|---|---|---|---|---|---|---|---|
| | | R | L | U | D | F | B | | |
| 311 | 312 | 313 | | | | | | 314 | 315 |
| | | | | | | | | | |
| | | | | | | | | | |

| User Range Name | User Range Address | Range Openness Direction | | | | | | Hidden Range Name | Hidden Range Address |
|---|---|---|---|---|---|---|---|---|---|
| | | R | L | U | D | F | B | | |
| 311 | 312 | 313 | | | | | | 314 | 315 |
| | | | | | | | | | |
| | | | | | | | | | |

FIG. 3

METHOD AND SYSTEM IN AN ELECTRONIC SPREADSHEET FOR INTRODUCING NEW ELEMENTS IN A CELL NAMED RANGE ACCORDING TO DIFFERENT MODES

TECHNICAL FIELD OF THE INVENTION

The present invention relates to the field of information processing by digital computers, and more particularly to a method and system, in an electronic spreadsheet, for defining and processing a cell named range which can be extended by the introduction of new elements.

BACKGROUND OF THE INVENTION

Before computers, numerical analysis, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modeling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, a letter to each column, and another letter to each sheet (or page) of the spreadsheet. To reference a location at column A and row 1 of the second page (i.e., the upper-lefthand corner), for example, the user types in "B:A1". In this manner, the spreadsheet defines an addressable storage location or "cell" at each intersection of a row with a column within a given page.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. Such spreadsheet cells can also be defined and named as a range as long as they are arranged as a connex set of cells. A typical example of such a named range simply corresponds to a regular table found in an accountant's pad. In this fashion, range names can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., Using Quattro Pro 2, Borland-OsbomelMcGraw-MII, 1990; and LeBlond, G. and Cobb, D., Using 1-2-3, Que corp., 1985. The disclosures of each of the foregoing are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas for instance, the spread of information can be recalculated using different sets of assumptions, with the results of each recalculation appearing almost instantaneously. Performing this operation manually, with paper and pencil, would require recalculating every relationship in the model with each change made. Thus, electronic spreadsheet systems were invented to solve "what-if" problems, that is, changing an input and seeing what happens to an output.

Named ranges used to automate the computations in a spreadsheet can evolve during the "life" of a spreadsheet just as some entries may be added to or deleted from a classical table found in an accountant's pad. Conventional spreadsheet tools offer some means for automatically adjusting the content of an existing named range when new elements (typically a new column, a new row or a new sheet) are added between elements already pertaining to the named range, or when some elements (typically a column, a row or a sheet) already pertaining to the named range are deleted. The relative location within the named range where new elements are added is commonly the choice of the spreadsheet user, motivated by his own criteria, such as, for instance, some sorting criteria. If the spreadsheet user decides to add to an existing named range some new elements just below the bottom one, or just above the first one, then conventional spreadsheets do not automatically update the named range because the newly introduced elements are not located between two elements pertaining to the named range. This limitation can be quite cumbersome in the frequent case where elements of a table are horizontally sorted by date, so that a new (recent) element of the named range must be commonly added by the introduction of a new row just below the last one of the named range.

SUMMARY OF THE INVENTION

An object of the present invention is to automatically adjust the limits of a named range for adding new elements (row, or column, or sheet) which are not located between two elements already pertaining to the named range, but in the immediate vicinity of an element pertaining to the named range.

The present invention relates to a method and system for processing a named range defined by a cell address range in a spreadsheet comprising a plurality of cells identified in each dimension by an address, each dimension comprising two directions. The method comprises the steps of:

defining an open named range by specifying to the named range one or a plurality of open directions; and defining a hidden named range with the cell address range of the open named range expanded by one address in every direction specified as open.

In response to user action, the method further comprises the steps of:

selecting one or a plurality of directions;

increasing the cell address range of the hidden named range by inserting between two consecutive cell addresses, a new address in selected directions; and updating the open named range with the cell address range of the hidden named range shortened by one address in every direction specified as open.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following Detailed Description of an illustrative detailed embodiment when read in conjunction with the accompanying Drawings, wherein:

FIG. 3 illustrates a structure of an Open Table according to the preferred embodiment of the present invention;

DETAILED DESCRIPTION OF THE INVENTION

System Hardware

Figure 1A:
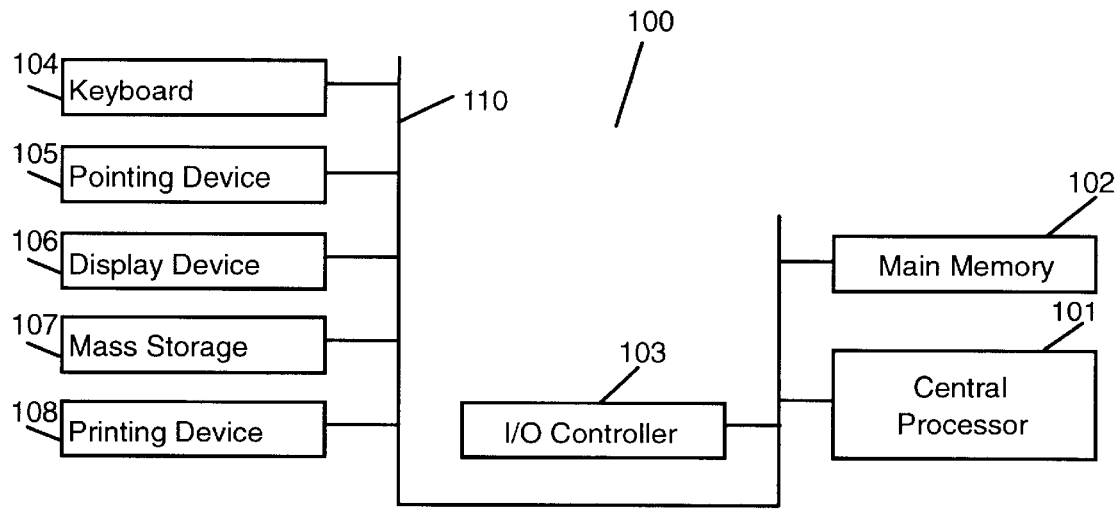
FIG. 1A is a block diagram of a computer system in which the present invention may be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including International Business Machine—IBM Corporation of Armonk, N.Y.).

Figure 1B:
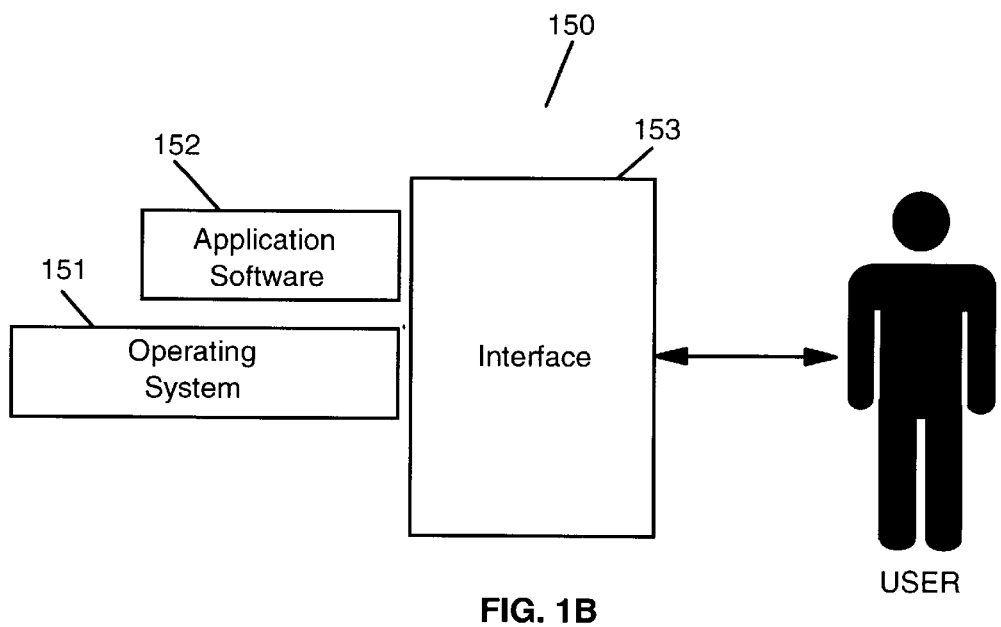
FIG. 1B is a block diagram of a software system including an operating system, an application software, and a user interface for carrying out the present invention.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded' (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 and interface 153 are Microsoft Win95, available from Microsoft Corporation of Redmond, Wash. Application module 152, on the other hand, includes a spreadsheet notebook of the present invention as described in further detail herein below.

Interface

A. Introduction

The following description will focus on the presently preferred embodiments of the present invention, which are embodied in spreadsheet applications operative in the Microsoft Win95 environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
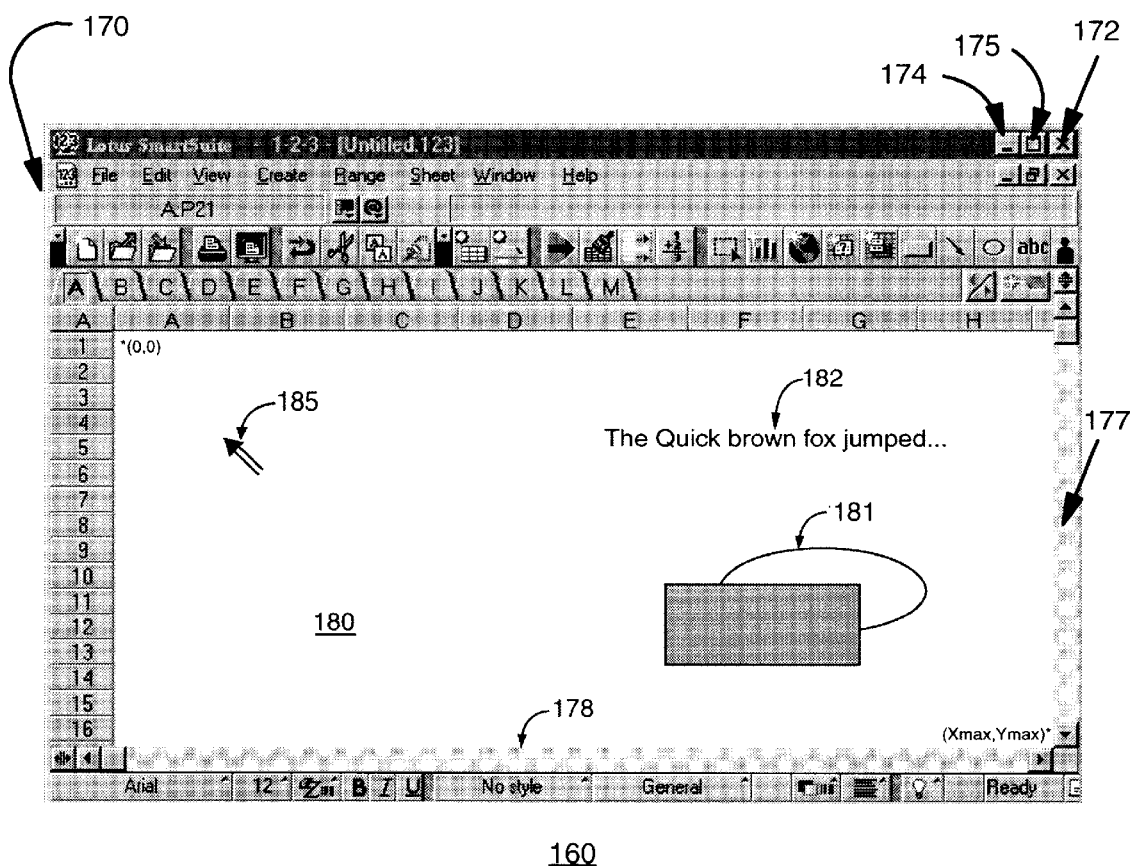
FIG. 1C illustrates the basic architecture and functionality of a graphical user interface in which the present invention may be embodied.

Referring now to FIG. 1C, the system 100 includes a windowing interface or workspace window 160. Window 160 is a rectangular, graphical user interface (GUI) for display on display device 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Window 160 includes a screen cursor or pointer 185 for selecting and otherwise invoking screen objects of interest. In response to user movement signals from the pointing device 105, the cursor 185 floats (i.e., freely moves) across the screen of display device 106 to a desired screen location. During or after cursor movement, the user may generate user-event signals (e.g., mouse button "clicks" and "drags") for selecting and manipulating objects, as is known in the art. For example, window 160 may be closed, resized, or scrolled by "clicking" (selecting) screen components 172, 174, 175, 177 and 178, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., Microsoft Mouse Programmer's Reference, Microsoft Press, 1989. The general construction and operation of a GUI event-driven system, such as Windows, is also known in the art: see, e.g., Petzold, C., Programming Windows, Second Edition, Microsoft Press, 1990. The disclosures of each are hereby incorporated by reference.

B. Preferred Interface

Figure 2A:
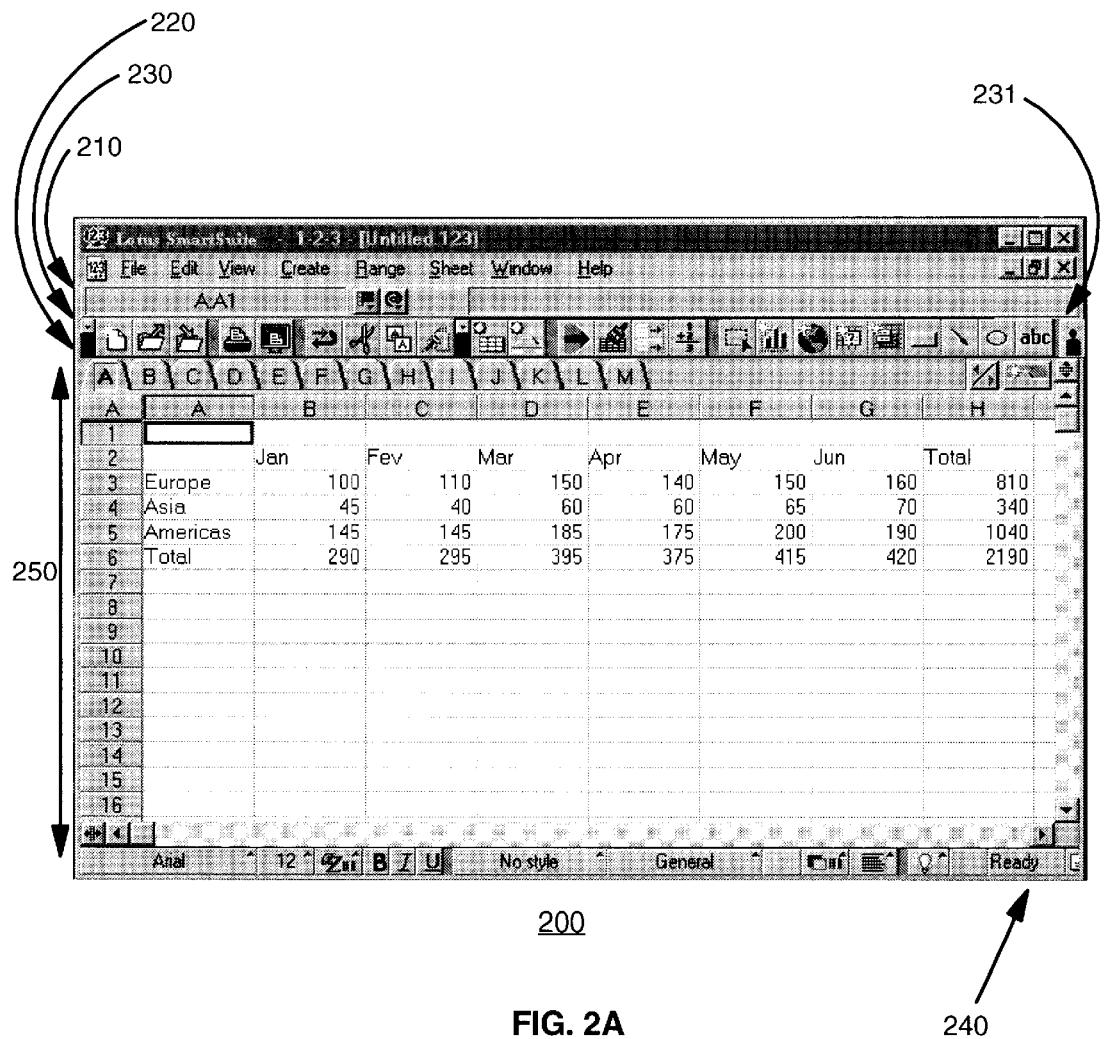
FIG. 2A shows a spreadsheet notebook interface according to the preferred embodiment of the present invention.

Shown in FIG. 2A, a spreadsheet notebook interface of the present invention will now be described. The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position, or the address or name of a selected named range (i.e. active selection). At the status line 240, system 100 displays information about the current state of the workbook; for example, a "READY" indicator means that the system is ready for the user to select another task to be performed.

Figure 2B:
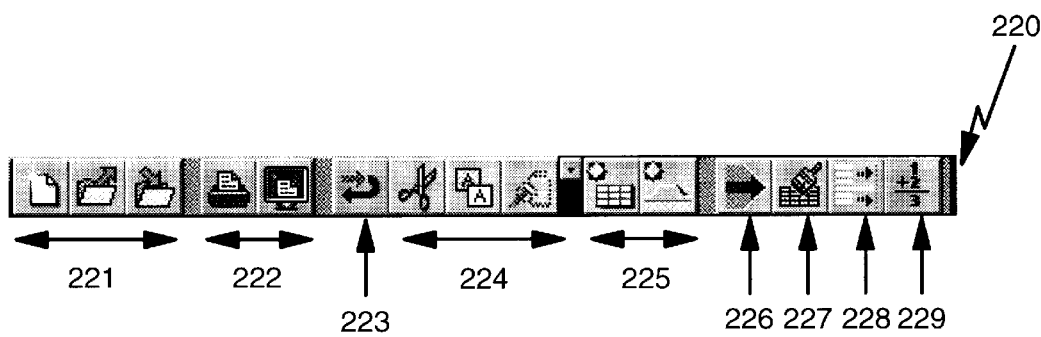
FIG. 2B shows the toolbar component of the notebook interface shown in FIG. 2A.

The toolbar 220, shown in further detail in FIG. 2B, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a named range selection button 226, a style copy button 227, a column resizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, resizing, and deleting. In a preferred embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a two dimensional spread. Page A from the notebook 200, for example, includes a grid in a row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

Figure 2C:
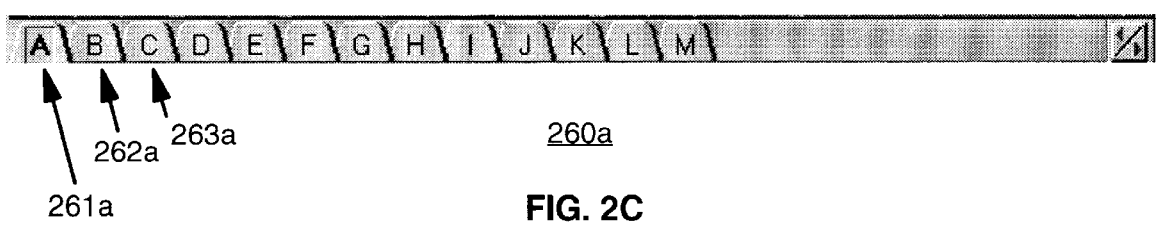
FIGS. 2C and 2D show page identifiers for rapidly accessing and manipulating individual pages of the notebook interface shown in FIG. 2A.
Figure 2D:
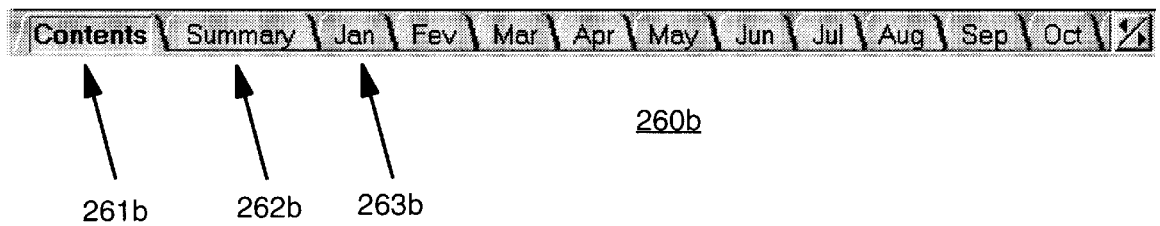

As shown in FIGS. 2C–D, individual notebook pages are identified by page identifiers 260, preferably located along one edge of a notebook. In a preferred embodiment, each page identifier is in the form of a tab member (e.g., members 261a, 262a, 263a) situated along a top edge of the notebook. Each tab member may include representative indicia, such as textual or graphic labels, including user selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user, however, as shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers serve to aid in the entry of spreadsheet named range addresses. For example, when entering a formula referring to a named range of cells on another page, the user may simply use the descriptive page name in the named range address, thus making it easier for the user to understand the relationship of the cell(s) or information being referenced.

A general description of the features and operation of the spreadsheet notebook interface may be found in Quattro Pro for Windows (Getting Started, User's Guide and Building Spreadsheet Applications), available from Borland International.

Management of Named Ranges

A. Introduction

As the power of spreadsheet environments has increased, it is today possible to develop complex custom applications solely based on spreadsheets, as opposed to applications developed with general purpose programming languages like C++ or VisualBasic from Microsoft Corporation. This can be achieved thanks to the spreadsheet imbedded tools such as macro languages, script languages and formulas which all manipulate spreadsheet named ranges, whether these named ranges correspond to single elements of information (a single cell named range), or to multiple elements of information (a complex named range).

In typical spreadsheet based applications, it is common to find tables whose content (or a subset of it) is declared as a named range. Defining such named ranges makes it easy to retrieve information from the table, for instance, by using database oriented functions which are able to perform some computations (summing or averaging, for instance) for the table entries matching a given set of criteria. When new elements are added within the named range, conventional spreadsheet programs automatically update the named range definition accordingly. With conventional notations, assume that a range named "CUSTOMER" is defined as A:C3..A:H33. This named range corresponds, on the first sheet A, to the intersection of the 31 rows from 3 to 33 included with the 6 columns from C to H included. Also assume that each row of this named range logically corresponds to a given customer whose characteristics (name, address, telephone, etc.) are recorded between columns C to H. If a new customer must be added to the CUSTOMER named range, assume that a new row is inserted between line 23 and line 24, just because the alphabetic order requires that it be placed there. As the newly introduced row falls within the interval [3 33] which is the projection of the named range on the row axis, then the conventional spreadsheet program will automatically adjust the CUSTOMER named range definition which becomes A:C3..A:H34. Indeed the rows 24 to 33 are pushed down by one position (and thus become the rows 25 to 34), leaving row 24 with an empty place where the new row can be inserted.

Now, if the new customer is the company "ZZZ Ltd", the new row to be added will likely be after the row 34, following the alphabetic order. In this case the conventional spreadsheet programs will effectively add a new row between the old rows 34 and 35, but the CUSTOMER named range will still correspond to A:C3..A:H33. Indeed, the newly introduced row is not located within the interval [3 33], but at the immediate edge of it. The absence of CUSTOMER named range update may result in wrong information returned by macros, functions, or whatever means based on the definition of the CUSTOMER named range. The present invention offers a user-friendly solution to this problem by allowing the definition of named ranges which can be automatically "extended" when introducing in the spreadsheet new elements having a single common edge with the named range.

B. Improved Named Range Manager

In contrast to the previously described conventional tools, the present invention provides a more powerful, user-friendly and interactive approach for managing the definition and update of named cell ranges in the form of a named range manager. The manager automatically allows the spreadsheet user to define if and how a named range must behave as a so-called "open named range" (as opposed to conventional "closed named range").

Closed Named Range: In typical spreadsheet programs organised as a 3D (three dimensions) set of cells (the three axes being the row axis, the column axis and the sheet axis), a closed named range can be formally defined as the intersection of three non-empty sets of contiguous elements along each axis. With conventional notations, the range named "MY_TABLE" with address C:E10..C:K18 corresponds to the intersection of the set of the cells whose row is between 10 and 18 included, with the set of cells whose column is between E and K included, and with the set of cells whose sheet is between C and C included. Adding a new row between row 10 and 18, or a new column between column E and K will result in a redefinition of the closed range named MY_TABLE.

Open Named Range: Open named ranges can also be defined like closed named ranges as the intersection of three non-empty sets of contiguous elements along each axis, but their behaviour differs when new elements are added on one of the three axis. Indeed with the previous named range example, if this named range is defined as open, then adding a new row between row 9 and 19 included, or a new column between column D and L, or a new sheet between sheet B and sheet D included will result in a redefinition of the closed named range MY_TABLE.

When a named range is defined as open, its behaviour upon the introduction of new elements along one of the three axis of conventional spreadsheet programs will depend on the "directions" along which the named range is defined as open. With conventional 3D spreadsheets, 6 different directions can be defined, two per axis: the right and left directions along the row axis, the up and down directions along the column axis, and the forward and backward directions along the sheet axis. In the previous example of the open range named MY_TABLE (C:E10..C:K18), this named range was in fact open in all the six directions. If this same named range were open only on the bottom direction, then it would differ from a classic closed named range when new rows are added just below the bottom row of the named range. Identically, if this same named range were open only on the right direction, then it would differ from a classic closed named range when new columns are added just on the right of the rightmost column of the named range. For any direction where the named range is declared as open, the introduction of a new set of elements along this direction will affect the definition of the named range if and only if the new set of elements has at least a single common boundary with the defined open named range. By combining different directions along which the named range is defined as open, different behaviour can be achieved on different directions.

C. Open Named Ranges

In a preferred embodiment, named ranges can be specified as open in any of the six following directions: the right and left directions along the row axis, the up and down directions along the column axis, and the forward and backward directions along the sheet axis. When selected, open named ranges can be easily identified on the display device 106 within the work area 180 of the window 160 by using some specific cell attributes, such as a font style or font color or background color, etc. In a preferred embodiment, the background color of a selected open named range is set to black (as for conventional closed named ranges), but in addition the background color of the border cells in the direction where the named range is open is in a blinking mode.

In a preferred embodiment, the present invention is used in two steps:

1. The first step occurs when the spreadsheet user decides, based on some criteria not detailed here, whether a given named range deserves to take advantage of the cell content manager or not.

The user first selects the relevant named range by using the pointing device 105 or the keyboard 104 and then invokes a specific command called "Open_Range" by conventional means available in spreadsheet environment, such as (but not limited to), dedicated push-buttons, keyboard entry short cuts, menu or submenu entries. For each of the six directions introduced above (right, left, up, down, forward, backward), the user specifies if the selected named range is open or not. At completion of the Open_Range command, the selected named range background color is set to blinking mode in the directions where it has been designated as open. This same command can also be used to update the definition of a named range already specified as open in some directions.

During execution of the Open_Range command, the spreadsheet program updates an internal table called an "Open Table", aimed to record in which directions the named range has been specified as open. The Open Table also records the definition of "hidden" closed named ranges uniquely associated with every open named range.

2. The second step occurs when the user introduces new elements (rows, or columns, or sheets) in the spreadsheet by using conventional means. Conventional spreadsheet programs invoke internal routines aimed to adjust the definition of all the closed named ranges impacted by the introduction of the new elements. During the execution of this conventional routine, all the defined closed named ranges (including the ones defined by the user, as well as the hidden ones recorded in the Open Table) are updated if the newly introduced elements are located within their boundaries. With the present invention, the spreadsheet program additionally invokes a specific internal routine referred to as "Update Open Range" which further adjusts the definitions of the open named ranges according to the directions along which they have been specified as open.

D. Open Table

The decision to specify which directions of a named range will behave as open or closed belongs to the spreadsheet application user. A single repository, called "Open Table", is used to record this information. This Open Table is preferably saved on a non volatile memory (typically but not necessary as part of the spreadsheet disk file on the mass storage 107).

Referring now to FIG. 3, the Open Table 300 corresponds to a logical simple structure made of several records 310, each of them associated with an open named range. Each record includes five fields:

The "User Range Name" field 311 is used for recording the name given by the spreadsheet user to the open named range. For instance, the User Range Name field would contain the character string "CUSTOMER" in the example given above.

The "User Range Address" field 312 records the address of the open named range, as specified by the user. For instance, the User Range Address field can correspond to the conventional address structure, Startsheet: StartrowStartcolumn..Endsheet:EndrowEndcolumn which writes as A:C3..A:H33 in the same above example.

The "Range Openess Direction" field 313 records in which direction the named range is open. In a preferred embodiment of the invention, this field corresponds to a structure of 6 sub-fields, each of them associated to a given direction (right, left, up, down, forward and backward). For each of this subfields, a Boolean variable indicates if the associated direction is open or not for the current open named range.

The "Hidden Range Name" field 314 is used to record the name of an internal named range, not visible to the spreadsheet user, which is used as part of this invention.

The "Hidden Range Address" field 315 records the address of the internal named range whose name is recorded in the previous field. For instance, the Hidden Range Address field can correspond to the conventional address structure Startsheet:StartrowStartcolumn..Endsheet:EndrowEndcolumn.

It is important to notice that the present invention mainly relies on the relation established between the user defined open named range and the hidden closed named range. Both of them have the attributes of a conventional closed named range in the sense that they are automatically adjusted by conventional means when a new element falling within their boundaries is introduced. In addition the open named ranges benefit from the present invention in the sense that they are also automatically adjusted when a new element falling at the edge of their boundaries is introduced.

In the preferred embodiment, the Open Table is explicitly included within the spreadsheet file itself, but other obvious implementations can rely on other means.

E. Open Range Method

Figure 4:
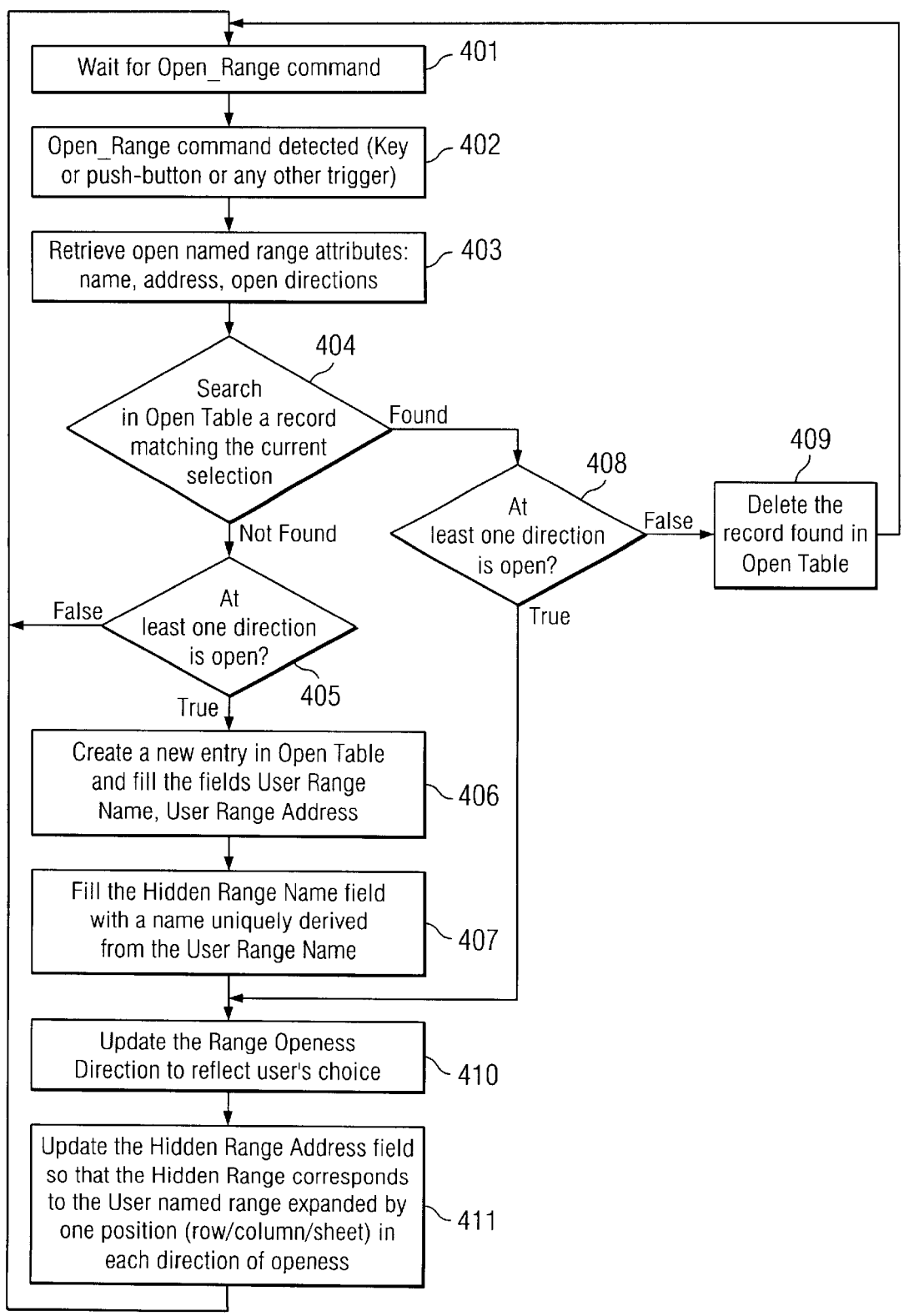
FIG. 4 is a flow chart illustrating a preferred method for specifying how a given named range can take advantage of the present invention.

The method for enabling or disabling a given named range to take advantage of the present invention is summarized in flowchart 400 of FIG. 4. This method can be seen as the processing of the "Open_Range" command. The method comprises the following steps:

At step 401, the method is in its default state, waiting for an event to initiate the process.

At step 402, an event is detected, as a result of a user action. This action can be, for instance, a specific combination of keys on the keyboard 104, or the click of the pointing device 105 on a specific button, or any other similar means not further specified here.

At step 403, the different attributes of the open named range are retrieved by using conventional user-interface means, such as but not limited to navigation with the pointing device 105 within menus and sub-menus, or some specific combination of keys on the keyboard 104.

Step 404 corresponds to a search in the Open Table to determine if the specified open named range has already been previously declared, and then recorded in this table. In a preferred embodiment of the present invention, the search criteria corresponds to the name of the open named range, as recorded in the field 311 within a record 310 of the Open Table. If such a matching record 310 is found in the Open Table, then control is given to step 408, otherwise control is given to step 405.

At step 405, a test is done to verify that at least one direction has been specified as open during step 403. If it is the case, control is given to step 406; otherwise the Open_Range command terminates without any update in the Open Table, and control is given back to step 401 for waiting for any further Open_Range command.

At step 406, a new record 310 is created in the Open Table, and the corresponding fields User Range Name (311) and User Range Address (312) are initialized to the named and address of the current open named range, as learned during the step 403.

At step 407, the field Hidden Range Name (314) is filled with a name which is uniquely derived from the User Name Range field (311). This allows the unambiguous determination of the name of any of these two named ranges, based on the name of the other one.

At step 408, a test is done to verify that at least one direction has been specified as open during step 403. If it is the case, then control is given to step 410; otherwise control is given to step 409.

When the step 409 is reached, an existing open named range has been specified as no longer open by the user during the step 403. Thus some housekeeping must be done in the Open Table by deleting the record found during the step 404. Afterwards control is given back to step 401 for waiting for any further Open_Range command At step 410, the Range Openess Direction field (313) is filled according to the directions declared by the user as open during the step 403. In a preferred embodiment of the present invention, this corresponds to setting a Boolean value (true or false) for each of the six sub-fields corresponding to each of the six directions of a 3D spreadsheet.

At step 411, the last field of the record 310 is filled (the Hidden Range Address field 315). This address is derived from the User Range Address field 312 by expanding this range address definition by one position in every direction specified as open. At the end of the step 408, the Open_Range command is over, and control is given back to step 401 for processing any further new command.

F. Update_Open_Range method

Figure 5:
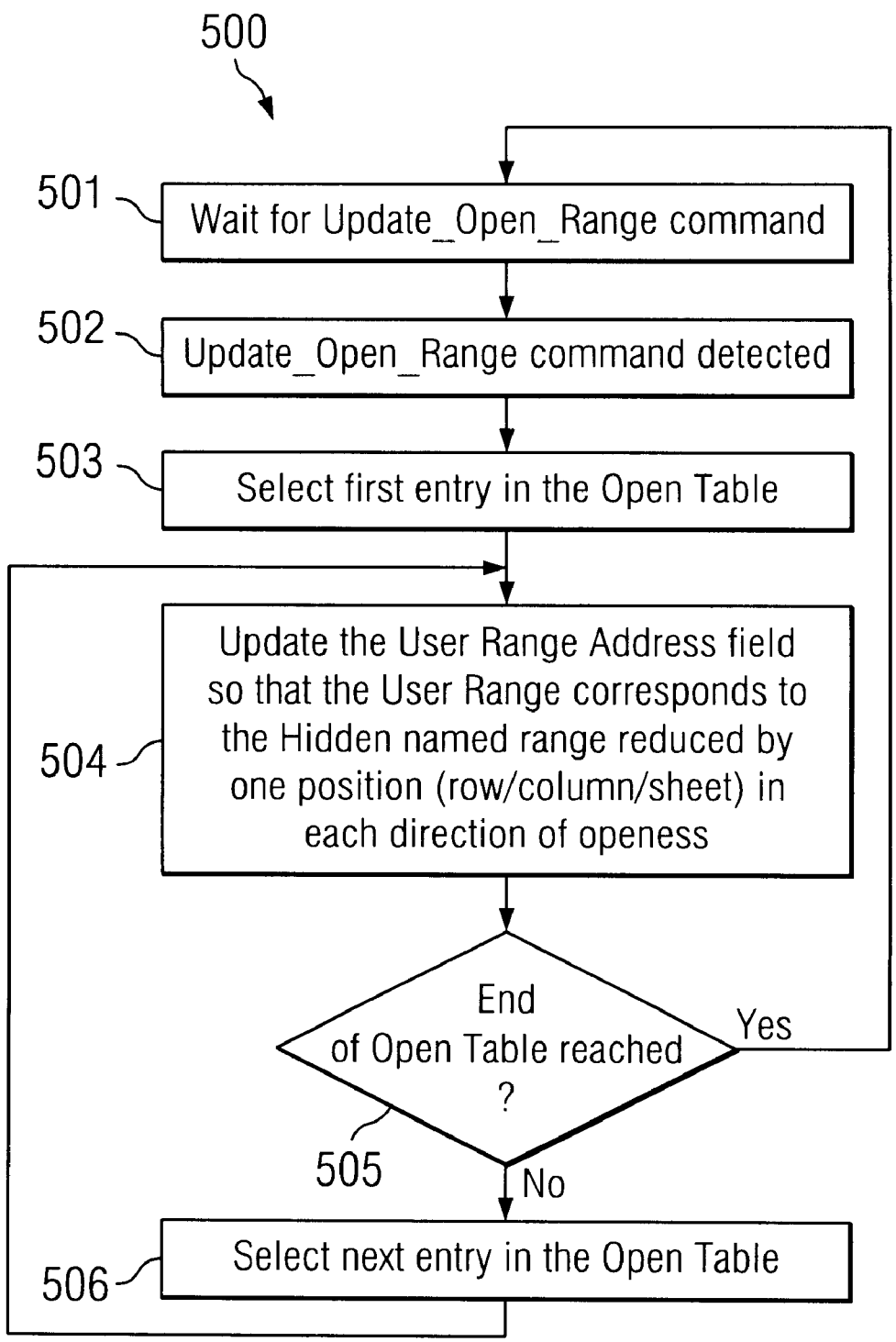
FIG. 5 is a flow chart illustrating a preferred method for updating an open named range upon the introduction of new elements (row or column or sheet) according to the present invention.

The method according to the present invention for updating an open named range upon the introduction of new elements such as rows, columns and sheets is summarized in flowchart 500 of FIG. 5. This method can be seen as an extension of the conventional methods which are applied to conventional closed named ranges, and which only update named ranges when introducing elements located within other ones already pertaining to the named range. The method comprises the following steps:

At step 501, the method is in its default state, waiting for an event to initiate the following process.

At step 502, the event is detected, as a result of a call to the routine implementing the Update_Open_Range method, when the conventional routines updating the conventional ranges upon the introduction of new elements in the spreadsheet are over.

At step 503, the first record 310 of the Open_Table is selected and becomes the current record.

At step 504, the second field of the record 310 is filled: it is the User Range Address field 312. This address is derived from the Hidden Range Address field 315 by reducing this range address definition by one position in every direction specified as open.

At step 505, a test is performed to check if the end of the Open_Table has been reached. If it is the case, then control is given to step 501 to wait for a new Update_Open_Range command. Otherwise, control is given to step 506.

At step 506, the next entry in the Open_Table is selected so that the current record becomes the one following the previous one. Then control is given back to step 504 for processing the new current record.

ALTERNATE EMBODIMENTS

While the invention has been particularly shown and described with reference to a preferred embodiment, it will be understood that various changes in form and detail may be made therein without departing from the spirit, and scope of the invention.

For instance, the improved named range management method and system according to the present invention may be used advantageously in those environments where elements of information are organised as multidimensional tables having more than three dimensions.

An improvement of the present invention would consist in defining some "openness templates" corresponding to a given pattern of open directions. When the user defines the directions along which a given named range must be opened (as part of the step 403), he or she could simply specify to apply a defined openness template rather than specifying for each direction if it is open or not.

What is claimed is:

1. A method of processing a named range defined by a cell address range in a spreadsheet comprising a plurality of cells identified in each dimension by an address, each dimension comprising two directions, said method comprising the steps of:

defining an open named range by specifying to the named range at least one open direction;

defining a hidden named range with the cell address range of the open named range expanded by one address in every direction specified as open;

in response to a user action, selecting at least one direction;

in response to a user action, increasing the cell address range of the hidden named range by inserting between two consecutive cell addresses, a new address in selected directions; and in response to a user action, updating the open named range with the cell address range of the hidden named range shortened by one address in every direction specified as open.

2. The method according to the preceding claim wherein the step of specifying at least one direction comprises the step of:

specifying at least one of the following:
      a right direction along a row axis;
      a left direction along a column axis;
      a down direction along a column axis;
      a forward direction along a sheet axis; and
      a backward direction along a sheet axis.

3. A method of processing a named range defined by a cell address range in a spreadsheet comprising a plurality of cells identified in each dimension by an address each dimension comprising two directions, said method comprising the steps of:

defining an open named range by specifying to the named range at least one open direction;

defining a hidden named range with the cell address range of the open named range expanded by one address in every direction specified as open;

in response to a user action, selecting at least one direction;

in response to a user action, increasing the cell address range of the hidden named range by inserting between two consecutive cell addresses, a new address in selected directions;

in response to a user action, updating the open named range with the cell address range of the hidden named range shortened by one address in every direction specified as open; wherein the step of specifying at least one direction comprises the step of:

specifying at least one of the following:
      a right direction along a row axis;
      a left direction along a column axis;
      a down direction along a column axis;
      a forward direction along a sheet axis; and
      a backward direction along a sheet axis, associating with the open named range a table comprising:
         a name for the open named range;
         a cell address range for the open named range;
         an identification of open directions;
         a name for the hidden named range; and
         a cell address range for the hidden named range; and
   maintaining said table each time the open named range is updated.

4. The method according to claim 3 further comprising the step of:

closing in the open named range at least one of said directions previously open.

5. The method according to claim 4 wherein the steps of defining an open named range, and of closing at least one direction, further comprises the step of:

modifying at least one display attribute attached to said open named range, said at least one attribute comprising color, font, or background color.

6. A spreadsheet system for processing a named range defined by a cell address range in a spreadsheet comprising a plurality of cells identified in each dimension by an address, each dimension comprising two directions, said system comprising:

means for defining an open named range by specifying to the named range at least one open direction;

means for defining a hidden named range with the cell address range of the open named range expanded by one address in every direction specified as open;

in response to a user action, means for selecting at least one direction;

in response to a user action, means for increasing the cell address range of the hidden named range by inserting between two consecutive cell addresses, a new address in selected directions; and in response to a user action, means for updating the open named range with the cell address range of the hidden named range shortened by one address in every direction specified as open.

7. A computer readable medium for processing a named range defined by a cell address range in a spreadsheet comprising a plurality of cells identified in each dimension by an address, each dimension comprising two directions, said computer readable medium comprising:

computer readable means for defining an open named range by specifying to the named range at least one open direction;

computer readable means for defining a hidden named range with the cell address range of the open named range expanded by one address in every direction specified as open;

in response to a user action, computer readable means for selecting at least one direction;

in response to a user action, computer readable means for increasing the cell address range of the hidden named range by inserting between two consecutive cell addresses, a new address in selected directions; and in response to a user action, computer readable means for updating the open named range with the cell address range of the hidden named range shortened by one address in every direction specified as open.

\* \* \* \* \*